(12) United States Patent
Meadow et al.

(10) Patent No.: US 8,207,964 B1
(45) Date of Patent: Jun. 26, 2012

(54) METHODS AND APPARATUS FOR GENERATING THREE-DIMENSIONAL IMAGE DATA MODELS

(76) Inventors: William D. Meadow, Jacksonville, FL (US); Randall A. Gordie, Jr., St. Augustine, FL (US); Matthew Pavelle, St. Augustine, FL (US)

( * ) Notice: Subject to any disclaimer, the term of this patent is extended or adjusted under 35 U.S.C. 154(b) by 1020 days.

(21) Appl. No.: 12/036,197

(22) Filed: Feb. 22, 2008

(51) Int. Cl.
*G06T 15/00* (2011.01)

(52) U.S. Cl. ........ 345/419; 345/426; 345/427; 345/441; 382/107; 382/154; 382/285; 701/207

(58) Field of Classification Search .................. 345/419, 345/426, 427, 441; 382/107, 154, 285
See application file for complete search history.

(56) References Cited

U.S. PATENT DOCUMENTS

| | | | | |
|---|---|---|---|---|
| 6,111,583 | A * | 8/2000 | Yaron et al. | 345/421 |
| 6,421,003 | B1 * | 7/2002 | Riley et al. | 342/357.38 |
| 6,759,979 | B2 * | 7/2004 | Vashisth et al. | 342/357.31 |
| 6,985,929 | B1 * | 1/2006 | Wilson et al. | 709/217 |
| 7,225,207 | B1 * | 5/2007 | Ohazama et al. | 1/1 |
| 7,457,706 | B2 * | 11/2008 | Melero et al. | 702/5 |
| 7,599,988 | B2 * | 10/2009 | Frank | 709/203 |
| RE41,175 | E * | 3/2010 | Vashisth et al. | 342/357.31 |
| 2005/0270288 | A1 * | 12/2005 | Arcas | 345/428 |
| 2008/0113672 | A1 * | 5/2008 | Karr et al. | 455/456.1 |

* cited by examiner

*Primary Examiner* — Kimbinh T Nguyen
(74) *Attorney, Agent, or Firm* — Joseph P. Kincart

(57) ABSTRACT

The present invention provides methods and apparatus for generating a three dimensional output which includes a continuum of image data sprayed over three-dimensional models. The three-dimensional models can be representative of features captured by the image data wherein image data can be captured at multiple disparate points along another continuum. The user interface can also include multiple modalities of image data and statistical analysis of the image data.

25 Claims, 7 Drawing Sheets

METHODS AND APPARATUS FOR GENERATING THREE-DIMENSIONAL IMAGE DATA MODELS

CROSS REFERENCE TO RELATED APPLICATIONS

The present application claims priority to pending patent application Ser. No. 11/216,465, filed, Aug. 31, 2005 and entitled, "Apparatus and Method for Producing Video Drive-By Data Corresponding to a Geographic Location,"; and also pending application Ser. No. 11/702,708 filed Feb. 6, 2007 and entitled Methods and Apparatus for Generating a Continuum of Image Data; and also pending application Ser. No. 11/702,707 filed Feb. 6, 2007 and entitled Methods and Apparatus for Presenting a Continuum of Image Data; the contents of which are each relied upon and incorporated by reference.

FIELD OF THE INVENTION

The present invention relates to methods and apparatus of generating image data. More specifically, the present invention relates to generating data descriptive of a continuum of three dimensional images, such as those comprising a geographic landscape.

BACKGROUND OF THE INVENTION

Images of geographic areas created on a local basis have been created in numerous formats. Photographs, movie cameras, video camera recorders, and more recently digital recorders have all been utilized to capture moving images of a geographic parcel. Photographs can be useful because they are easily associated with a particular real estate parcel, however they are limited in the scope of the subject matter that they can include. In addition, photographs must be manually acquired and docketed in order to be associated with a property and subsequently retrieved. Panoramas can increase the scope of the subject matter to a point, but are limited by a point of capture of the panoramic views.

Movie pictures, video recorders and digital recorders and other "motion pictures" provide for increased scope of image capture. However, it is sometimes difficult to locate and view a particular portion of interest of images captured as motion pictures. In addition, correlation of particular portions of a motion picture with a particular real estate parcel can be difficult if the motion picture includes more than one real estate parcel. For example, it is relatively difficult to locate and view a particular real estate parcel in the context of its neighborhood setting, or particular aspects of its setting. Aerial images, such as satellite pictures of geographic areas have also been captured and specific parcels of land or landmarks can be located on the aerial images.

In addition, methods and apparatus have been known for generating point clouds and generating representations of particular objects from processing of the point clouds.

However, prior to the present invention, there has not been a mechanism for generating a continuum of object representations based upon point cloud data.

SUMMARY OF THE INVENTION

Accordingly, the present invention provides methods and apparatus for generating a continuum of three dimensional image data. In some embodiments, the continuum of three dimensional image data provides a street level representation of geographic locations. Two or more sets of image data are captured of a subject area, wherein each of the two or more images are captured from disparate points on a continuum.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments.

DETAILED DESCRIPTION OF PREFERRED EMBODIMENTS

Figure 1:
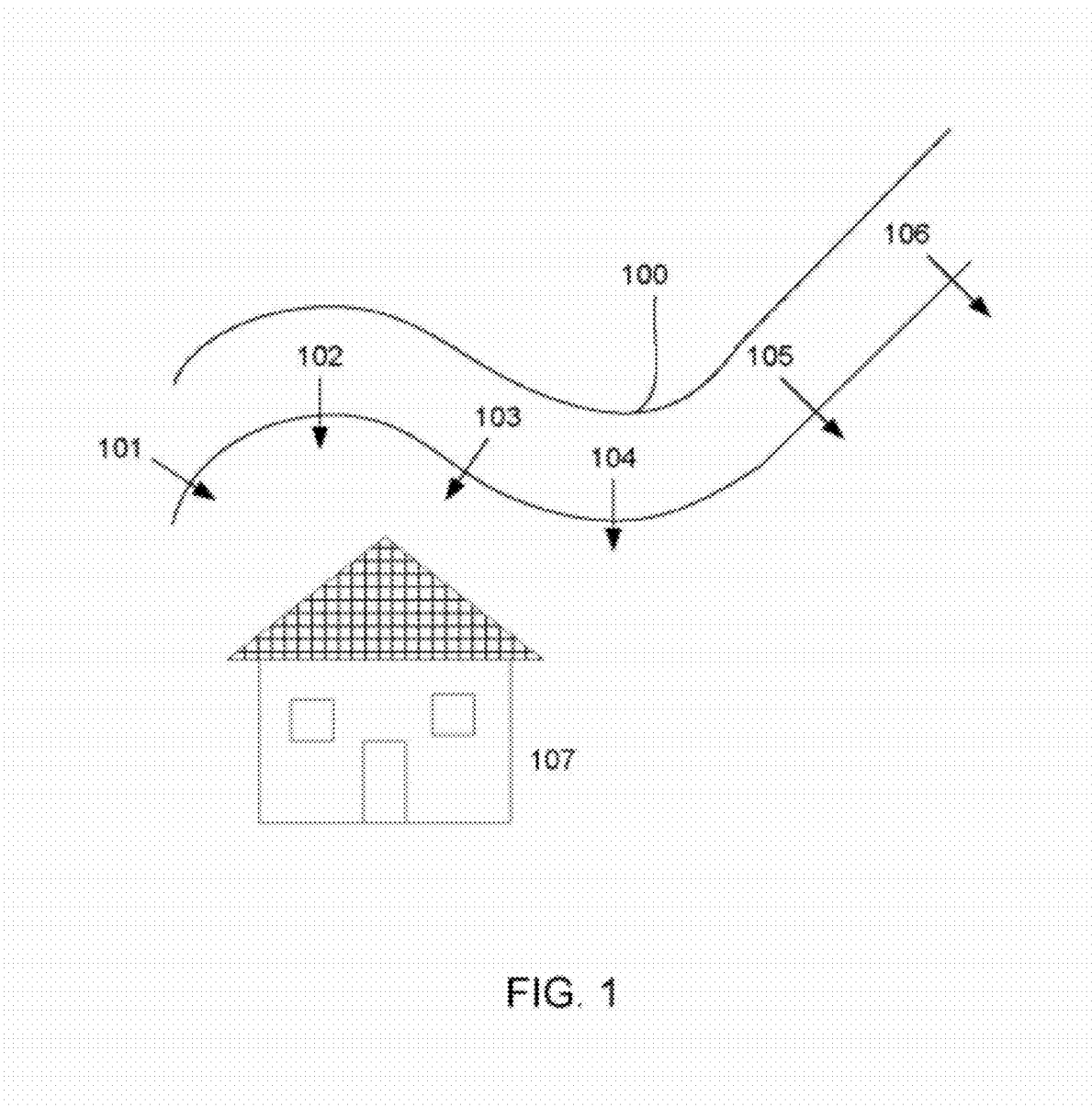
FIG. 1 illustrates a continuum from which image data sets capture a subject.

The present invention provides methods and apparatus for presenting three-dimensional model of a subject, such as a geographic area. The three-dimensional models can include a polygon based model format generated from a point cloud array and sprayed with actual image data of the subject, captured from disparate points along a continuum.

A user interface is presented with user interactive controls which allow a user to traverse the three-dimensional model. A user location within the model will determine which portions of the three-dimensional model are viewed. Some embodiments can include user interactive devices which allow a user to traverse the three-dimensional model in three directions: a) an essentially up and down vertical movement; b) an essentially side-to-side horizontal movement; and c) a depth movement into and out of the three-dimensional model. Image data and three-dimensional polygon based models presented to an inventor at a given instance can be dependent upon the relative position selected by the user within the user interface.

In another aspect, icons, overlays and metadata can be presented to a user upon demand to provide further information relating to a given geographic area within view.

Still another aspect can include presentation of one or more geographic areas based upon criteria ascertainable from related data. For example, image data can be correlated with geospatial data so that a particular street address or Cartesian coordinate, such as a latitude/longitude location, is designated and specific image data is presented which correlates with the geospatial data. The specific image data can be presented sprayed over three-dimensional structures generated from two-dimensional image data captured from that specific location.

In additional aspects, some embodiments can also include indications on the user interface of user selectable data related to a particular location. User selectable data can include, for example: cellular phone signal strength; wireless network data, including network name, location and signal strength; global position system satellite data and signal strength; radio signal strength; school district data, average yard size, property price range; building features; proximity to amenities; political boundaries; zoning restrictions; and almost any other measurable quantity. Datum can all be correlated according to a geographic location and presented in various combinations or upon demand. In addition, the data can be presented in conjunction with or independent of, an image data continuum or image data set.

DEFINITIONS

As used herein, Video DriveBy™ refers to street level video data captured in multiple angles encompassing a 360° view.

As used herein, Video FlyBy™ refers to Aerial/Satellite oblique (angular) view images with polygon line views.

As used herein, RibbonView™ refers to a film strip like view of properties which stands up at approximately 90° from a flat or angled aerial/satellite ortho image map and provides direct-on front images of properties to be displayed.

As used herein, Flash Viewer (Streaming Video) refers to direct streaming of video to an online user via a web browser.

Methods

According to the present invention, image data is captured from disparate points along a continuum. Referring now to FIG. 1, in some embodiments the continuum 100 includes the path of a vehicle carrying a digital camera, or other image data capturing device. Image data sets are captured at disparate points 101-106 along the continuum.

Some preferred embodiments include capturing each image data set at an angle that is generally orthogonal to the subject matter 107.

Positional data and orientation of the camera capturing image data sets is recorded for each disparate point 101-106 along the continuum from which an image data set is captured. Positional data can include any data indicative of where the subject matter of an image data set is located. Some preferred embodiments of positional data include Cartesian coordinates that are context sensitive according to the mechanism used to generate coordinate data.

Positional data can be generated, for example, by an image data recording device, such as a camera, associated with a device for recording a global position (GPS device). Time stamps associated with image data sets and time stamps associated with the GPS data can be utilized to correlate the GPS location data with image data set recorded by the image data recording device.

In still another aspect, in some embodiments, an altimeter can be used to record an altitude from which a camera records image data sets. The altitude data can be associated with an image data set, for example, metadata correlated with the image data set. Such embodiments can therefore include recordation of a latitude, longitude and altitude coordinate for a given image data set. In addition, it is also within the scope of this invention to record a time of generation of an image data set and a depth of focus for an image data set.

According to the present invention, geospatial data, such as latitude and longitude coordinates, can be generated by the GPS and stored with image data generated by the camera. In some embodiments, GPS data can be time stamped and collected once every second. However, in some instances, GPS reception can be interrupted, depending upon location relative to large object, such as multistory buildings, or cold cover. Therefore, some additional embodiments can include an accelerometer for recording motion associated with a camera and a GPS unit operatively attached to the camera.

Data from the accelerometer can indicate movement of the camera. Some accelerometers, such as micro electro-mechanical system (MEMs) accelerometers can easily be incorporated into a camera system assembly attached to a vehicle. Use of multiple MEM accelerometers positioned to measure movement in four or more directions along an x-axis, y-axis, and z-axis in relation to a camera can also be used to calculate direction of movement. The accelerometer can therefore be used to extrapolate a current position of the camera, based upon a last set of GPS geospatial data recorded.

Geospatial data can be used to indicate an initial geographic position. A change in geospatial data can be additionally utilized to indicate velocity and direction of image data set capture. Accelerometer data may also be used to indicate a velocity and direction of image data set capture. Accelerometer data may also be used to indicate a velocity and direction of camera movement. Calculations of time elapsed at the indicated velocity (such as for example, the Kalman Filter) can yield a calculated position at a time of image capture, even if the time of image capture is between GPS readings.

For example, one standard can include tracking a camera position with a GPS unit that records location at a rate of once per second. The camera can record image data at a faster rate than once per second, such as, for example, one of: 12 images per second, 24 images per second or 29.97 images per second. An initial camera position can be recorded which correlates with a GPS reading, subsequent image data capture will occur in between the one second GPS reading interval. The camera position can be determined with a calculation based upon the velocity of camera movement supplied by the accelerometer and time elapsed since a previous GPS reading.

Still other embodiments can utilize optical flow methodology and visual odometry to facilitate calculations of a camera position and the velocity of a vehicle or person from which a series of image data sets are captured. Visual odometry can be accomplished with a single omni-directional camera or with stereo cameras, and is based upon processing which tracks the position of salient features in a series of feature sets and calculates movement based upon the relative positions of the features. In some embodiments, camera based simultaneous localization and mapping (SLAM) of visual image data can also be used to facilitate calculations of velocity of a change in position of a camera used to capture image data sets. Typically, the velocity will be directly tied to the motion of a vehicle to which the camera is mounted, or a person carrying a camera rig.

Orientation of a camera can include a direction of image capture recorded by the camera. Orientation can be designated, for example, in relation to the cardinal directions, i.e. north, south, east and west. Any means available to record such a designation, such as an electronic compass, is within the scope of the present invention. However, it may be desirable to include a means to record the orientation with a greater degree of accuracy than is typically available through the use of an electronic compass.

Therefore, in some embodiments, orientation can be determined according to a fixed position of a camera in relation to the direction of travel of a vehicle (or person) used to transport the camera. For example, a plurality of cameras can be fixedly attached to a vehicle capturing Video DriveBy™ data. Each camera therefore maintains a constant direction of image capture in relation to the heading of the vehicle. Mechanics of the camera, such as, for example, lens parameters and shutter speed, can indicate a depth of field during camera image data capture. Some embodiments can also include simultaneously capturing multiple image data sets and correlating two or more of the image data sets. Correlation can be accomplished via a time stamp or other chronological or synchronous.

The position of a camera can be combined with a direction of image capture and the depth of field of the camera, to determine a location of image data captured by the camera at a particular instance in time. The present invention can also include apparatus for utilizing echo location to determine a distance of an object from a camera capturing an image data set and storing a correlated distance with the image data set. For example, radar data can be correlated with a camera image data set to calculate the location of various objects captured by the camera. A time stamp can also be combined with data to quantify a location for a particular image formed by the captured image data.

In some embodiments of the present invention data used to calculate a location of an image is stored in a metadata file space associated with the image data. For example, some embodiments can store metadata in the exchangeable image file format (EXIF), TIFFTAGS or International Press Telecommunication Council (IPTC) formats. Image data may be stored, for example in JPEG or TIFF formats. However, other metadata formats can also be used. Typically, due to the size of data files that are generated during capture of Video DriveBy™ data, the image data and metafile data are stored on an external data storage device, such as a hard disk drive operatively attached to the camera. However, in some embodiments, the data can be stored in the camera.

As discussed above, the metadata can include data descriptive of some or all of: date and time; camera settings such aperture, shutter speed and focal length; geospatial data from a GPS receiver unit; accelerometer data; inertial guidance system data; camera orientation; and camera fixed position related to vehicle travel.

Figure 2:
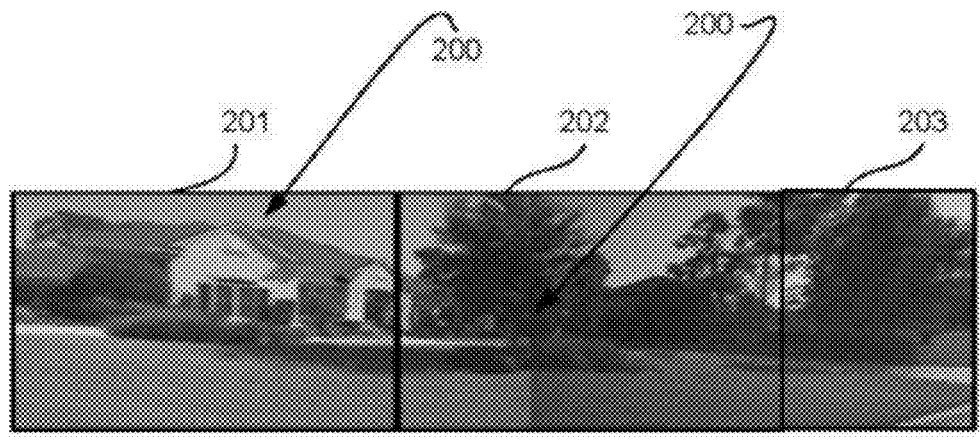
FIG. 2 illustrates multiple images captured from disparate points along a continuum.
Figure 3:
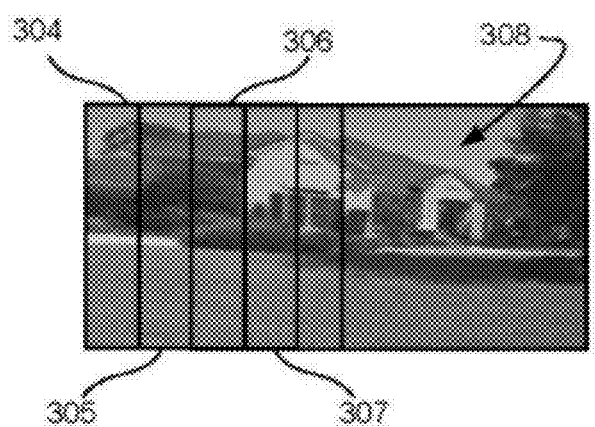
FIG. 3 illustrates multiple image data sets that overlap subject matter.

Referring now to FIG. 2, exemplary image data sets 201-203 are illustrated which capture images of a subject 200 from different points along a continuum. In some embodiments, as illustrated in FIG. 3, image data sets 304-307 overlap the subject matter captured. The overlap allows for features present in one image data set to be present in a second image data set, and preferably in a tertiary image data set.

Figure 4:
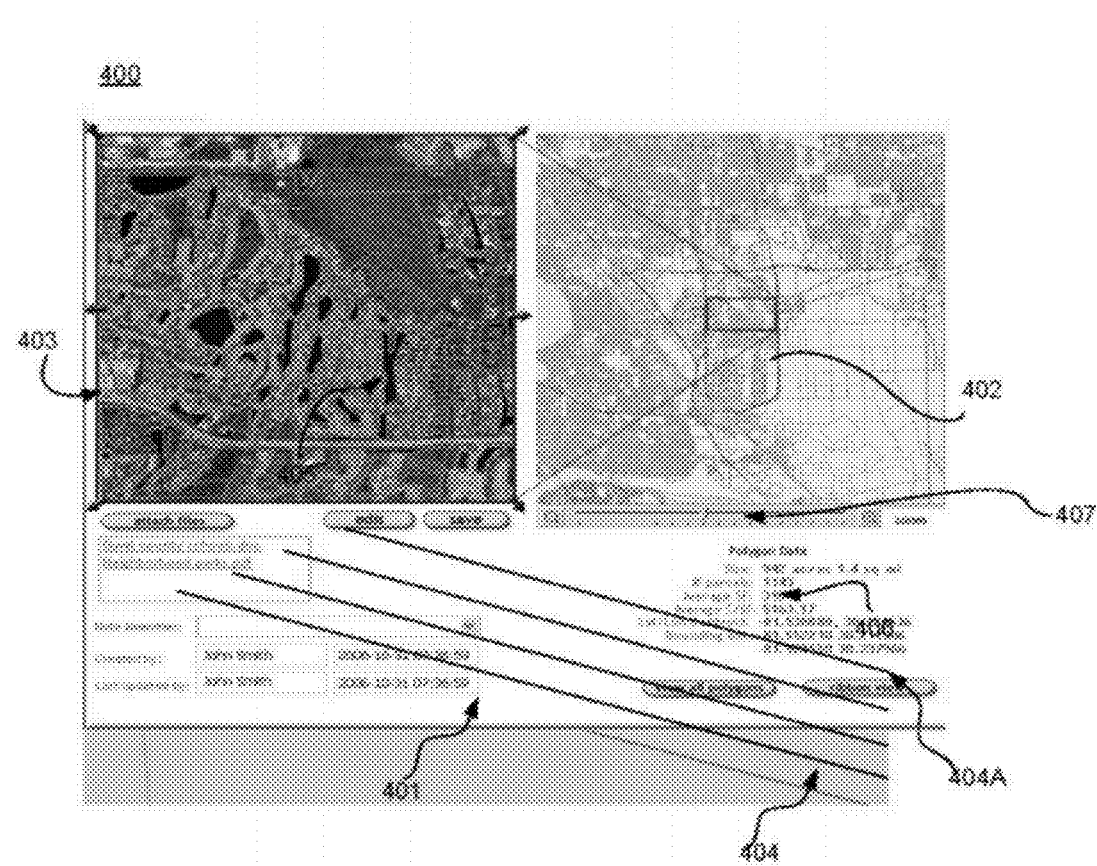
FIG. 4 illustrates a three-dimensional model generated form the image data sets.

Referring now to FIG. 4 a block diagram illustrates three-dimensional structures 405-407 created from image data captured. In some embodiments, the structures can be created by generating a point cloud array from a plurality of features contained in the image data sets and converting the point cloud array to a polygon based model. The polygon based model can be associated with a location relative to the image data set and image data can be sprayed over the polygon based model. In some preferred embodiments, image data sprayed over the polygon based models includes the composite of image data.

According to the present invention, a user can traverse the presentation of the composite of image data and the three-dimensional structures. Movement through the user interface can be accomplished with any known interaction device, such as, for example one or more of: a keyboard, mouse, video game controller Apple IPhone, digital cellular phone, remote controller, WiiMote and a joystick.

The user interface can allow a user to move in three directions through a scene presented. The directions can include an x coordinate providing a vertical dimension 401, a y dimension providing a horizontal dimension 402 and a z coordinate providing a depth dimension 403. Three-dimensional modeling sprayed with actual image data allows the user to proceed in "off-track" paths that do not match a path created by the disparate points from which data is collected.

In some embodiments, a time dimension can also be traversed, such as, for example, image data sets of a geospatial designation across time chronology such as a period of seasons or years. Some embodiments can include a "take me there" time designation, wherein a user can indicate a time period and geospatial description. According to the present invention, a three-dimensional model can be generated with image data sets from the indicated time period for the designated geospatial area.

As the user moves into a scene presented in the user interface, planes of image data 405 can change according to the perspective chosen by the user. For example, a three-dimensional structure of a house can be sprayed with image data included in the continuum composite of image data. The actual image data will correlate with a surface of the three-dimensional structure facing the disparate points from which the image data was captured. According to the present invention, additional surface of the house 406 can also be sprayed with a texture and color captured by the actual image data. In this way, as a user moves in a z direction beyond front surface of the house, the user will be presented with additional surfaces of the house, with each surface having a color and texture extrapolated from the image data from the front of the house.

In addition, an object such as a tree 405 can also be created in three dimensions with color and texture based upon the image data composite. In some embodiments, user interactive device controls can be provided which allow a user to remove objects such as the tree 405 and the house 406. Removal of an object will allow the user to see beyond the removed object into the scene provided. For example, if a tree 405 obscures the view of the front of a house 406, activation of a user interactive control can remove the tree 405 allowing an unobstructed view of the three-dimensional model of the house 406. If actual image data is not available for those portions of the house now viewable in the unobstructed view, then the present invention allows for color and texture data matching the known surfaces of the house to be sprayed over those portions now viewable.

Some embodiments can additionally allow a user to modify color and texture of three-dimensional models presented to them. Such modifications facilitate "what-if" scenarios. For example, a buyer contemplating purchasing a particular property can be presented with a three-dimensional model of the property with three-dimensional representations of objects on the property sprayed with actual image data captured of the property. According to some embodiments, the buyer can then modify the view presented to represent possible changes that may be made to the property. Changes may include, to continue the example, providing a brick façade over a painted surface, or removal of shrubbery, or addition of shrubbery. Addition of items can be provided from a menu of three-dimensional objects made available to the user. Color selections and textures can also be made available via a user selectable menu. In this fashion a unique blend of a composite continuum of image data and user defined image data can be presented, including three-dimensional modeled objects derived from the image data and user modifications to such models.

By way of non-limiting example, in some embodiments, a user may be able to select a building and designate from a user interface a type and color of roofing the user would like to see illustrated for the building. Accordingly, a user may designate an architectural shingle in various hues, or a Spanish tile or steel roof and the present invention will spray the pattern and color selected onto a three-dimensional model of the building. In still other embodiments, it is within the scope of some embodiments of the present invention to allow a user to upload a texture and color to be sprayed upon a three-dimensional model, or a portion of the three-dimensional model, such as a roof portion. According to such embodiments, a user may upload a color or hue or texture to be sprayed upon a three-dimensional model of a structure. The color and hue may also be stored and made available for subsequent application to portions of an image data set.

Figure 5:
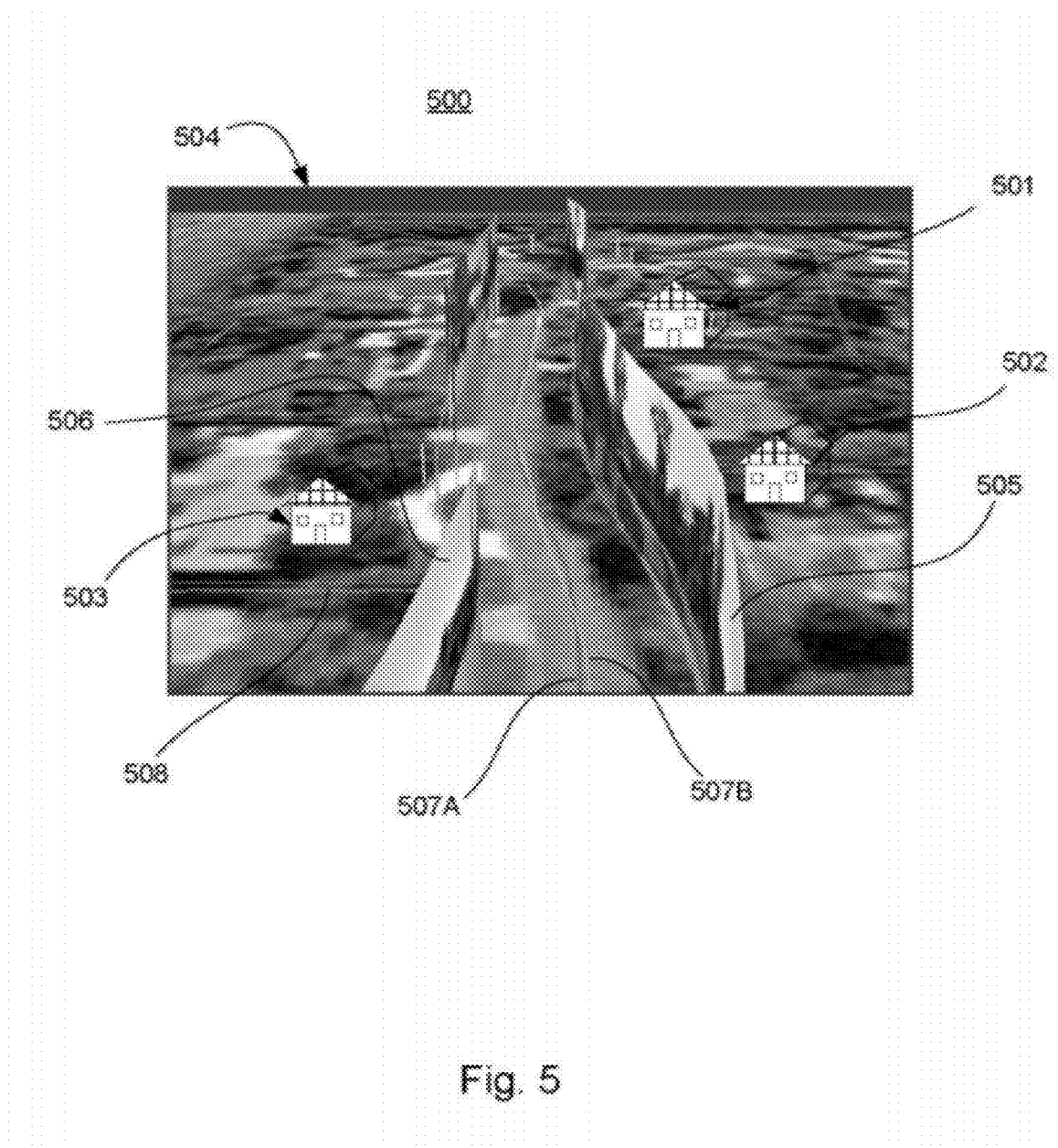
FIG. 5 illustrates a user interface generated from the image data sets and including multiple modalities of image data.

Referring now to FIG. 5, the present invention can also include generation of a user interface 500 with multiple representations of image data relating to a geographic area. For example, an aerial view of a geographic area 504 can be combined with one or more two-dimensional continuums of composite image data 505-506. The two-dimensional continuums of composite image data 505-506 can be generated according to methods and apparatus described in a related co-pending patent application by the same inventors. In addition, one or more continuums of disparate points from which image data is captured can also be indicated on the aerial view 504. Three-dimensional models 510-503 can also be included in the user interface 500 and located on the aerial view according to geospatial data generated during image data capture and processing of the image data.

As described in a related application, the three-dimensional models can be generated from multiple image data sets captured from disparate points along a continuum sprayed with the image data captured.

According to some embodiments of the present invention, a user may locate a particular geographic area via different vehicles made available to a user. For example, a user can enter a geospatial designation, such as, for example, one or more of: a street address; a Cartesian coordinate; a "Favorite" name designating a geospatial area; a popular name for a geospatial area; a coded indication for a geospatial area, such as a multiple listing number or data file number; and metadata. According to the present invention, a "take me there" command can be executed to bring the user to the requested geospatial area. Alternatively, the present invention provides a vehicle "cockpit" interface which allows a user to virtually "fly" over an aerial view and then transition into a virtual "dashboard" and "drive" mode along a street level two-dimensional continuum of actual image data, and in some preferred embodiments, a continuum of composite image data. The user may also transition into a virtual three-dimensional modality which includes three-dimensional models sprayed with image data captured from a continuum of disparate points. The three-dimensional models can be viewed from a virtual "drive by" mode or a virtual "walkabout." The virtual walkabout can allow a user to go off path and view the geographic area from amongst three-dimensional models sprayed with image data captured from a continuum of disparate points. In addition, as discussed above, the user may manipulate the appearance of the three-dimensional models.

A take me there command can be additionally operative to designate a modality, such as the aerial view, two-dimensional ribbon view, or three-dimensional drive by or three-dimensional walk about view into which a user will enter.

In another aspect of the present invention, a user can be provided with tools that provide analysis of the image data shown. Analysis can include, for example, designation of a particular portion of a geographic area 508. The portion 508 can be representative of a real estate parcel, as indicated by municipal records, or some other designation. For example, a user may draw a polygon 508 onto an aerial image of a geographic area 500 and ask for analysis of the area contained within the polygon 508.

Analysis can include, by way of example, a calculation of an area included within the polygon. Other analysis can include more sophisticated calculations. For example, it is within the scope of the invention to designate property boundaries, such as, through county record data and locate an image data of the property. The image data can be used to generate a three-dimensional model of the property, including a model of a house within the property boundaries and other features, such as trees and utility demarcations. Based upon the location of the house within the property boundaries, the present invention may also be used to generate a size of a front yard, and, by extrapolation, the size of the side and back yards. An approximate size of a house can also be calculated based the dimensions of the three-dimensional model generated. Other features, such as how many stories, the house includes and the type of façade the house has may also be ascertained from analyzing the image data and the model.

Statistical representations can also be made, according to the analysis. Statistical representations can provide a summary of characteristics of a single real estate parcel, or a designated area. By way of example, statistical analysis can include one or more of an average, median and high/low value designation for: the size of a property within a given neighborhood, the size of a front yard, how much road frontage each property includes, the average size of the houses within the designated area, the number of stories comprising the buildings within the area, siding types of buildings within the area, the size of side yards between houses, height of trees within the area, and almost any other data that may be calculated from the image data sets and the three-dimensional models.

Figure 6:
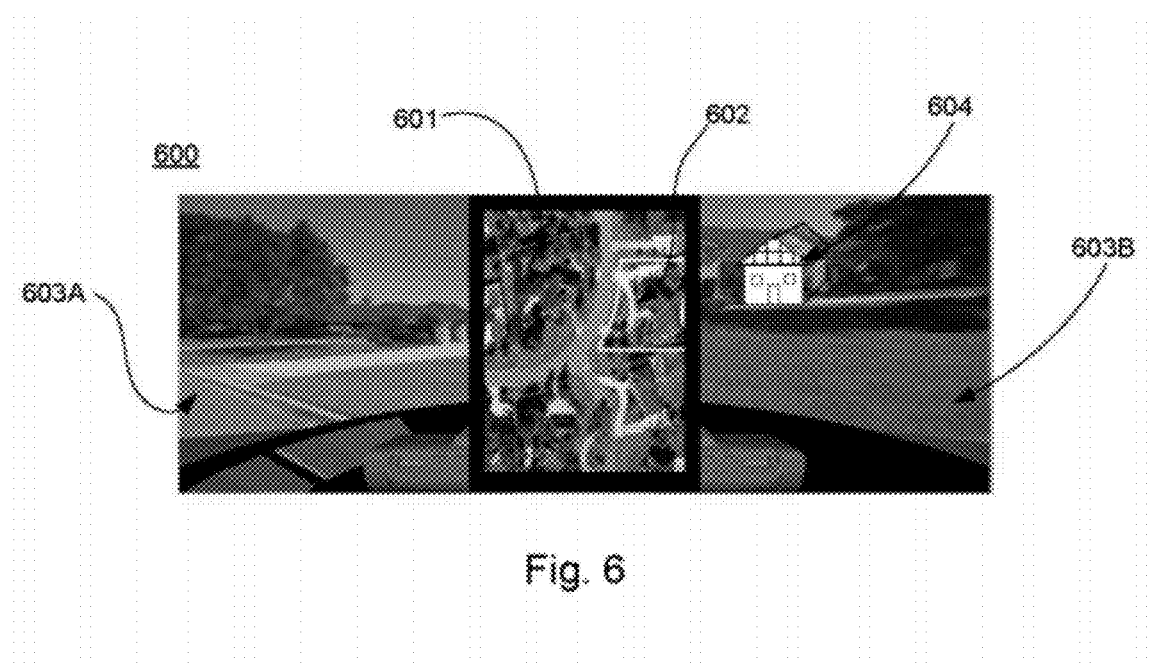
FIG. 6 illustrates an exemplary user interface for traversing multiple modalities of image data.

Referring now to FIG. 6, a view of an alternative exemplary user interface 600 according to the present invention is illustrated. The interface 600 can include a portion with an aerial view 601 and a polygon designation of geographic area of interest, such as for example, a particular real estate parcel or neighborhood location. The interface may also include a portion with a two-dimensional continuum of image data 603A. The continuum of image data is preferably a composite of image data sets captured from disparate points. Another portion 603B can include image data sprayed over three-dimensional models 604 generated from point clouds of features captured by the image data sets.

Figure 7:
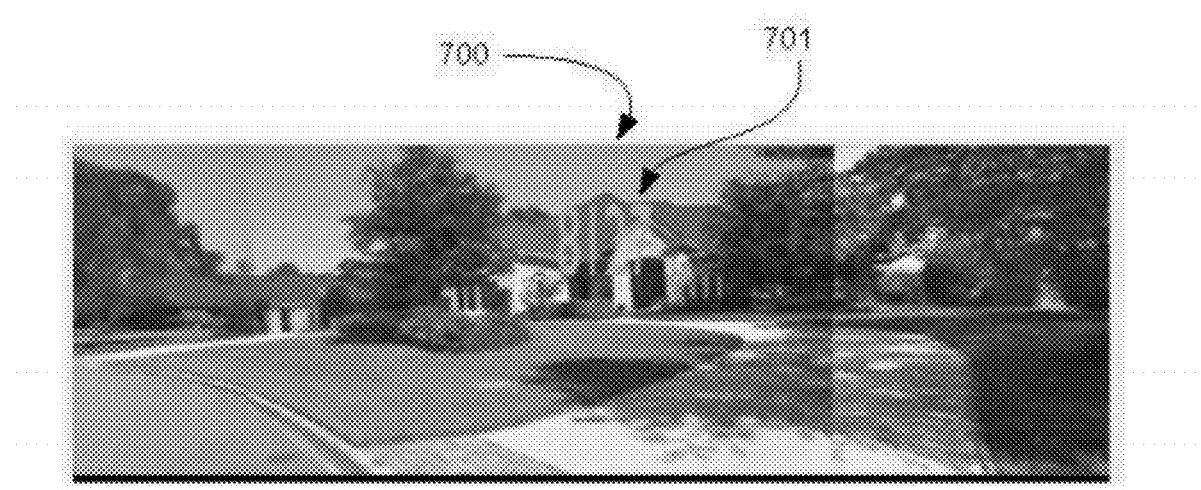
FIG. 7 illustrates an exemplary composite of image data set portions.

Referring now to FIG. 7, in some preferred embodiments, image data sprayed over the three-dimensional polygon formats includes a composite image formed by aligning two or more of the image data sets. Unlike stitching processes previously known, the present invention creates a composite through alignment of portions of data from more than one data set. Alignment can be accomplished in image data processing. Using image data processing, the images 701-703 are aligned to form a composite image 700. The composite image 700 is essentially two dimensional image data arranged as a second continuum, or ribbon. The second continuum includes ongoing image data 701-703 captured from the points defining the first continuum.

In some particular embodiments, the series of points of image capture in the first continuum includes positions of a vehicle carrying an image capture device, such as a camera, as the vehicle traverses a path proximate to a geographic area. The camera is positioned to capture image data of the geographic area. Image data 701-703 is periodically captured as the vehicle traverses the path. The motion of the vehicle, combined with the periodic capture of image data 701-703, thereby results in image data 701-703 being captured from disparate points along the first continuum.

A preferred embodiment includes capture of image data with a motion vector of the camera in space maintained generally orthogonal to a subject for which image data will be captured. Orthogonal capture of the image data can facilitate consistency for subsequent composite of portions of the image data captured. Therefore, data captured at an angle of between about 75° and 105° can provide data most easily assembled into a continuum of data. However, other angles may be used to create different effects. In addition, in some embodiments physical limitation may dictate the use of other angles. In such instances, post processing can be utilized to compensate for the angle of image data capture.

During image data processing, some or all of the images are aligned to form a composite image in the form of a continuous pictorial representation of the geographic area. One commercial embodiment of a continuous pictorial representation includes RibbonView™ by Real Data Systems. RibbonView™ correlates a ribbon of geographic image data with geospatial designations to facilitate identification of a particular geographic area, as discussed more fully below. In various embodiments, image capture processing can be accomplished in real time or via post image capture processing.

In some embodiments, select portions 704-707 of two or more sets of captured image data are aligned to generate the composite image 708. As illustrated, some preferred embodiments include vertical slices of data 704-707 aligned in a horizontal plane to form the composite image 708. Unlike a traditional photograph taken with a macro lens, according to the present invention, the length of a horizontal plane defining a composite image 708 is only limited by the length of a continuum along which points are defined and from which image data 704-707 is captured.

The use of only slices of data 704-707 from any particular captured image provides for a higher quality image 708. The quality is increased, for example, when a temporary obstruction, such as a passing car, person or animal, captured in one image data set, is only represented in a thin slice of a continuous ribbon 704-707 data. In addition, alignment of multiple thin slices of image data 704-707 is facilitated from the perspective of which aberrations typical human sensory is capable of distinguishing. Numerous thin slices 704-707 are perceived as a smoother transition across the horizontal plane defining the composite image 708 removing a choppiness that may be experienced with the use of larger data images.

The present invention can include a uniform width of each slice of data 704-707 or a variable width. The width of a particular slice may vary, for example, upon one or more of the velocity of a vehicle from which image data sets are captured, the sample rate of a camera used to capture an image data set 701-703, the resolution of a picture comprising an image data set 701-703 and the path of a camera. A high resolution image generated by a 2.1 mega pixel camera may have a 1600 by 1200 resolution and allow for a thinner slice 704-707 that includes a width of between about 5 to 700 pixels of an image data set. Embodiments with very high quality can include a slice 704-707 of between 1 to 2 pixels.

From a different perspective, some embodiments can include a slice 704-707 of an image data set 701-703 that includes a percentage of the image data set 701-703. Accordingly, some preferred embodiments can include a slice 704-707 of between about 5% to about 12% of an image data set. Other preferred embodiments can include up to about 50% of an image data set. However, it should be understood that some embodiments include a slice 704-707 that constitutes any fraction of the complete image data set.

It should be noted that although preferred embodiments may utilize vertical rectangular slices 704-709, the scope of the present invention is not limited by which portion of an image data set 701-703 is utilized to generate a composite image 270. Therefore, it is within the scope of the invention to use any portion of any image data set 701-703 to generate a composite image. Accordingly, slices of an image 701-703 other than vertical slices 704-709 may be apportioned and combined into a composite image 270. Slices may therefore include a slice angled at 60° or 75°, or other angle conducive to a particular application. In addition, it is also within the scope of the present invention to utilize irregular shaped portions of two or more image data sets 701-703 to generate a composite image 270.

In some embodiments, a database or other data processing mechanism, can track each portion or slice 704-708 utilized to construct a continuum and associate the slice 704-708 with an original image 701-703 from which the slice 704-708 is derived. User interactive devices can execute the retrieval of an entire original image 701-703 or a series of original images 701-703 upon request. In some instances, one or more original images 701-703 may provide detail not included in the composite image 708.

In some embodiments, a selected portion of an image data set may be determined by the physical attributes of the equipment used to capture an image data set. For example, a typical camera lens can impart some distortion to an image data set, as represented in the illustration by an elongated portion and a compressed portion. Utilizing only a portion of an image data set, such as, for example, a center portion vertical slice, can minimize the effect of distortion introduced by a lens, or other source, to a composite image. Distortion is minimized when the composite image is made to include those portions of the image data set corresponding with the center of the lens. Specific embodiments may likewise account for other aberrations that may be present in a set of image data.

It will be apparent to those schooled in the art that the length of a composite image generated according to the present invention is limited only by the ability to capture image data from additional points on a continuum and store the captured image data for post processing. The post processing allows for the alignment of portions of the image data compiled into a composite two-dimensional view that can continue so long as additional image data is made available to be added to it.

Apparatus

Figure 8:
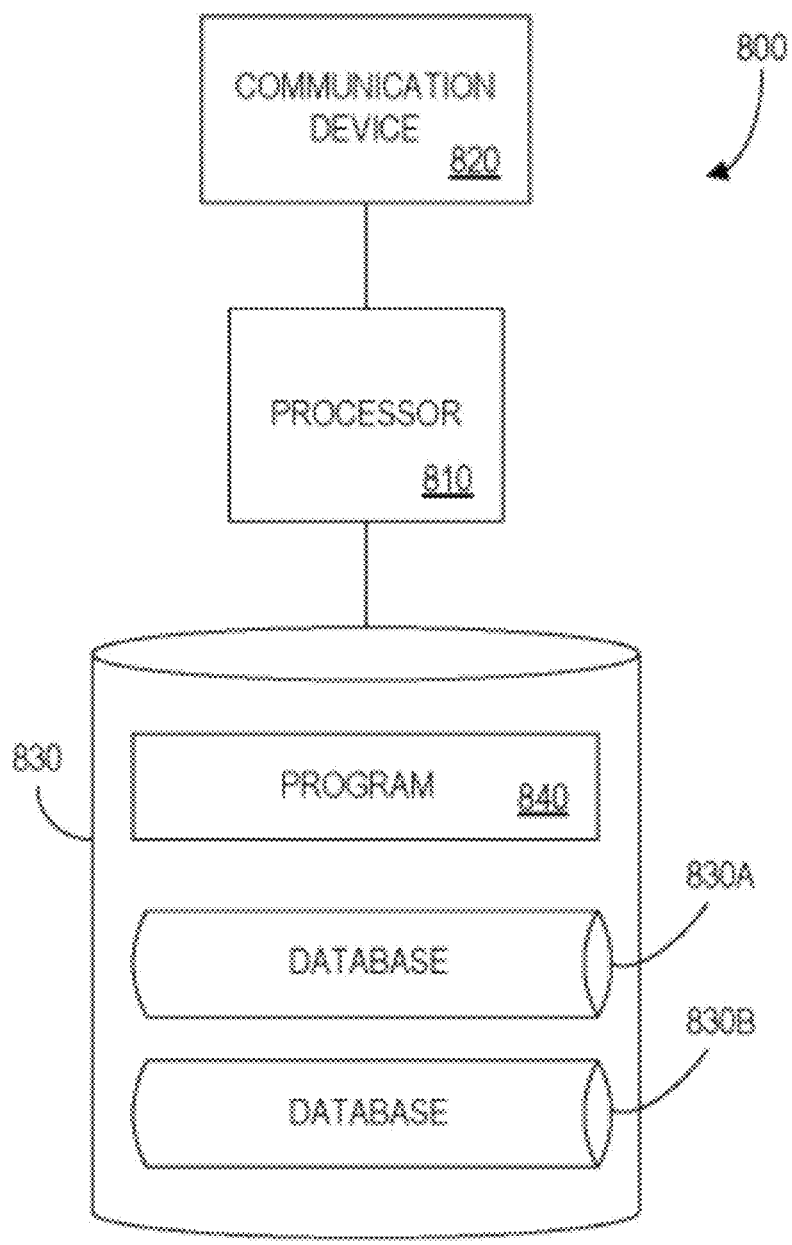
FIG. 8 illustrates apparatus what may be used to implement the present invention.

The teachings of the present invention may be implemented with any apparatus capable of embodying the innovative concepts described herein. Image capture can be accomplished, for example, via a digital camera capable of capturing 12 or more images per second. In addition, FIG. 8 illustrates a controller 800 that may be utilized to implement some embodiments of the present invention. The controller 800 comprises a processor unit 810, such as one or more processors, coupled to a communication device 820 configured to communicate via a communication network (not shown in FIG. 8). The communication device 820 may be used to communicate, for example, with one or more online devices, such as a personal computer, laptop or a handheld device.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 can store a program 840 for controlling the processor 810. The processor 810 performs instructions of the program 840, and thereby operates in accordance with the present invention. The processor 810 may also cause the communication device 820 to transmit information, including, in some instances, control commands to operate apparatus to implement the processes described above. The storage device 830 can additionally store related data in a database 830A and database 830B, as needed.

In some preferred embodiments, apparatus includes a video and data server farm. The video and data server farm includes at least one video storage server that stores video image files containing video drive-by data that corresponds to a geographic location, a database server that processes a data query received from a user over the Internet that corresponds to a geographic location of interest, and an image server. In operation, the database server identifies video image files stored in the video storage server that correspond to the geographic location of interest contained in the data query, and transfers the video image files over a pre-processing network to the image processing server. The image processing server converts the video drive-by data to post processed video data corresponding to a desired image format, and transfers the post processed video data via post-processing network to the Internet response to the query.

A landing zone server can also be included which receives the video drive-by data from a portable memory device and permits the viewing and analysis of the video drive-by data prior to storage in the video storage server. Still further, a map server is preferably provided to present a static image an overhead view of the geographic location of interest.

Embodiments can also include one or more servers described above included in one or more physical units. Each server does not need to be a disparate apparatus. Still other embodiments can include one or more or the servers described above included in multiple physical units. Some embodiments can even include a single server, as described which includes multiple physical apparatus units at disparate locations.

CONCLUSION

A number of embodiments of the present invention have been described. Nevertheless, it will be understood that various modifications may be made without departing from the spirit and scope of the invention. For example, various methods or equipment may be used to implement the process steps described herein or to create a device according to the inventive concepts provided above and further described in the claims. In addition, various integration of components, as well as software and firmware can be implemented. Accordingly, other embodiments are within the scope of the following claims.

The invention claimed is:

1. Apparatus for generating a three-dimensional model based upon two dimensional image data, the apparatus comprising:
   a processor operatively attached to a data storage device and executable computer code stored upon the data storage device and executable upon demand to cause the processor to:
   receive two or more images of a subject, wherein the two or more images comprise two dimensional image data captured from disparate points on a geospatial continuum and comprise portions aligned in a dimension consistent with the continuum;
   generate a two dimensional composite image of the subject comprising the aligned portions of the two or more images;
   create a human readable output comprising one or more three-dimensional models of the subject, the one or more three-dimensional models comprising one or more polygon based models generated from a point cloud array based upon structures included in the two dimensional composite image of the subject and sprayed with two dimensional image data of the subject captured from disparate points along the continuum.

2. The apparatus of claim 1 wherein the human readable output additionally comprises user interactive controls operative to traverse the three-dimensional model.

3. The apparatus of claim 1 wherein a selection of one or more three-dimensional models is presented based upon an indication of a geospatial location.

4. The apparatus of claim 3 wherein the geospatial location is indicated with a Cartesian coordinate.

5. The apparatus of claim 3 wherein the geospatial location is indicated with a latitude and longitude designation.

6. The apparatus of claim 1 wherein a selection of one or more three-dimensional models is presented based upon an indication of a street address.

7. The apparatus of claim 1 wherein a selection of one or more three-dimensional models is presented based upon an aerial view of a geographic area comprising polygon outline indicating a selected portion of the geographic area.

8. The apparatus of claim 3 wherein the software is additionally operative to provide a human readable output comprising user interactive devices operable to allow a user to traverse the three-dimensional model in one or more of three directions including: a) an essentially up and down vertical movement; b) an essentially side-to-side horizontal movement; and c) a depth movement into and out of the three-dimensional model.

9. The apparatus of claim 3 wherein the image data and three-dimensional polygon based models presented to a user at a given instance are based upon a relative position selected by the user within the user interface and a response to a command issued via a user interactive device.

10. The apparatus of claim 3 wherein the software is additionally operative to provide at least one entry of metadata relating to a given geographic area within view.

11. The apparatus of claim 3 wherein specific image data captured of a particular geographic area is presented sprayed over three-dimensional structures generated from two-dimensional image data captured from that specific location.

12. The apparatus of claim 3 wherein the software is additionally operative to provide an indication of cellular phone signal strength.

13. The apparatus of claim 3 wherein the software is additionally operative to provide an indication of a wireless network data signal strength.

14. The apparatus of claim 3 wherein the software is additionally operative to provide an indication of a global position system satellite data and a signal strength.

15. The apparatus of claim 3 wherein the software is additionally operative to provide an indication of a radio signal strength.

16. The apparatus of claim 3 wherein the software is additionally operative to provide an indication of a school district data encompassing a designated geospatial area.

17. The apparatus of claim 3 wherein the software is additionally operative to provide an indication of an average yard size included in a designated geospatial area.

18. The apparatus of claim 3 wherein the software is additionally operative to provide price range for real estate parcels included in a designated geographic area.

19. The apparatus of claim 3 wherein the software is additionally operative to provide one or more of: building features; proximity to amenities; political boundaries; and zoning restrictions.

20. A method of generating a three-dimensional model of a geographic subject area, the method comprising:
- capturing image data of a subject with an image capture device from disparate points along a continuum; wherein the image data comprise two or more images comprise two dimensional image data captured from disparate points on a geospatial continuum and comprise portions aligned in a dimension consistent with the continuum;
- generate a composite image of the subject comprising the aligned portions of the two or more images;
- generating with a computerized system a point cloud array based upon a structure withing the composite image;
- generating a three-dimensional model of an object included on the geographic area, wherein the three-dimensional model comprises one or more polygon based models generated from the point cloud array; and
- spraying at least a portion of the image data captured on the three dimensional model.

21. The method of claim 20 wherein the spraying of the image data captured on the three-dimensional model creates a human readable output.

22. The method of claim 21 additionally comprising the step of creating a composite of image data comprising a portion of multiple disparate image data sets and spraying the composite image data on the subject.

23. The method of claim 22 additionally comprising the step of generating a user interactive control operative to traverse the three-dimensional model.

24. The method of claim 22 additionally comprising the steps of:
- generating a selection of one or more three-dimensional models; and
- presented selection of one or more three-dimensional models based upon an indication of geospatial location.

25. The method of claim 24 wherein the geospatial location is indicated with a Cartesian coordinate.

* * * * *